(12) United States Patent
Christian

(10) Patent No.: US 8,540,214 B2
(45) Date of Patent: Sep. 24, 2013

(54) VEHICLE LIFT

(76) Inventor: Brad Christian, San Clemente, CA (US)

(*) Notice: Subject to any disclaimer, the term of this patent is extended or adjusted under 35 U.S.C. 154(b) by 424 days.

(21) Appl. No.: 12/807,476

(22) Filed: Sep. 7, 2010

(65) Prior Publication Data

US 2012/0056142 A1    Mar. 8, 2012

(51) Int. Cl.
*B66F 5/02* (2006.01)
*B66F 3/00* (2006.01)
*B66F 3/24* (2006.01)
*B66F 7/16* (2006.01)
*B60P 1/48* (2006.01)

(52) U.S. Cl.
USPC ...... 254/93 R; 254/10 R; 254/10 B; 254/8 C; 254/133 R; 254/124; 254/134; 254/93 H; 254/93 L; 254/2 B; 254/120

(58) Field of Classification Search
USPC ............... 254/10 R, 10 B, 8 C, 133 R, 124, 254/134, 93 H, 93 L, 93 R, 2 B, 120; 414/462, 414/917, 557, 558
See application file for complete search history.

(56) References Cited

U.S. PATENT DOCUMENTS

| | | | |
|---|---|---|---|
| 2,553,236 A | 5/1951 | Bratfisch | |
| 2,860,898 A | 11/1958 | Dooley, Jr. | |
| 3,415,395 A | 12/1968 | Bishman | |
| 3,633,951 A | 1/1972 | Hinkle et al. | |
| 4,058,228 A | 11/1977 | Hall | |
| 4,182,193 A | 1/1980 | Schultz, Jr. | |
| 4,339,121 A | 7/1982 | Schwarzkopf | |
| 4,474,359 A * | 10/1984 | Weaver | 254/8 C |
| 4,499,970 A | 2/1985 | Hussey | |
| 4,576,539 A | 3/1986 | Williams | |
| 4,901,980 A * | 2/1990 | Hansen | 254/9 C |
| 5,016,858 A * | 5/1991 | Mitchell | 254/45 |
| 5,111,912 A | 5/1992 | Kempf | |
| 5,394,959 A * | 3/1995 | Cullity et al. | 187/244 |
| 6,089,544 A * | 7/2000 | Ellis | 254/1 |
| 6,354,552 B1 | 3/2002 | Chiu | |

(Continued)

FOREIGN PATENT DOCUMENTS

DE    20021296 U1    5/2001
JP    10201939    8/1998

OTHER PUBLICATIONS

U.S. Appl. No. 12/800,393, filed Nov. 17, 2011, Christian.

(Continued)

*Primary Examiner* — Monica Carter
*Assistant Examiner* — Nirvana Deonauth
(74) *Attorney, Agent, or Firm* — Gray Law Firm; Gordon E. Gray, III

(57) ABSTRACT

The present invention is a vehicle lift. In particular, the present invention is directed to a vehicle lift that can be mounted to the rear of a vehicle or used as a stand-alone lift. A preferred embodiment of the lift comprises a vehicle platform mounted to two platform saddles supported by two lifting arms and two support arms. The lifting arms and support arms are pivotally attached to a mount frame at one end and the platform saddles on the other end. A spacer sleeve is attached between the lifting arms and has a lock bar inserted through it. Lift locks are attached to each end of the lock bar and can lock the lift. Two drives are attached to the mount frame at one end and to the spacer sleeve at the other end. When the platform is in a raised position, the drives are extended.

11 Claims, 16 Drawing Sheets

(56) References Cited

U.S. PATENT DOCUMENTS

| | | |
|---|---|---|
| 6,364,597 B2 | 4/2002 | Klinkenberg |
| 6,884,018 B1 | 4/2005 | Dugan et al. |
| 6,974,123 B2 * | 12/2005 | Latvys .......................... 254/122 |
| 7,195,106 B2 | 3/2007 | Heynssens |
| 7,798,469 B2 * | 9/2010 | Junca .......................... 254/9 B |
| 2002/0127082 A1 | 9/2002 | Carpenter |
| 2008/0206030 A1 | 8/2008 | Reuille et al. |
| 2008/0284225 A1 | 11/2008 | Gauthier et al. |
| 2010/0096868 A1 | 4/2010 | Saadat |
| 2010/0196131 A1 | 8/2010 | Blom |

OTHER PUBLICATIONS

DE20021296 Machine Translation provided by http://www.espacenet.com.

JP10-201939 Machine Translation provided by JPO Database.

\* cited by examiner

VEHICLE LIFT

TECHNICAL FIELD

The present invention is a vehicle lift. In particular, the present invention is directed to a vehicle lift that can be mounted to the rear of a vehicle, such as a passenger vehicle, truck, or recreational vehicle, or be used as a stand-alone device to lift vehicles such as mobility scooters, motorcycles, all-terrain vehicles and motorized scooters.

BACKGROUND ART

A number of different vehicle lifts exist including U.S. Pat. No. 6,364,597. However, the prior art and the design of the '597 patent have significant drawbacks. For example, the '597 vehicle platform is weakly attached to the lifting arms and can result in breakage. Additionally, two of the external joints of the '597 lift reduce clearance for vehicle placement. Accordingly, a vehicle lift is needed that is more durable and allows more clearance for loading and unloading vehicles.

SUMMARY OF THE INVENTION

The present invention is a vehicle lift. In particular, the present invention is directed to a vehicle lift that can be mounted to the rear of a vehicle or used as a stand-alone lift. A preferred embodiment of the lift comprises a vehicle platform mounted to two platform saddles supported by two lifting arms and two support arms. The lifting arms and support arms are pivotally attached to a mount frame at one end and the platform saddles on the other end. A spacer sleeve is attached between the lifting arms and has a lock bar inserted through it. Lift locks are attached to each end of the lock bar and can lock the lift. Two drives are attached to the mount frame at one end and to the spacer sleeve at the other end. When the platform is in a raised position, the drives are extended.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a vehicle lift.

Figure 1:
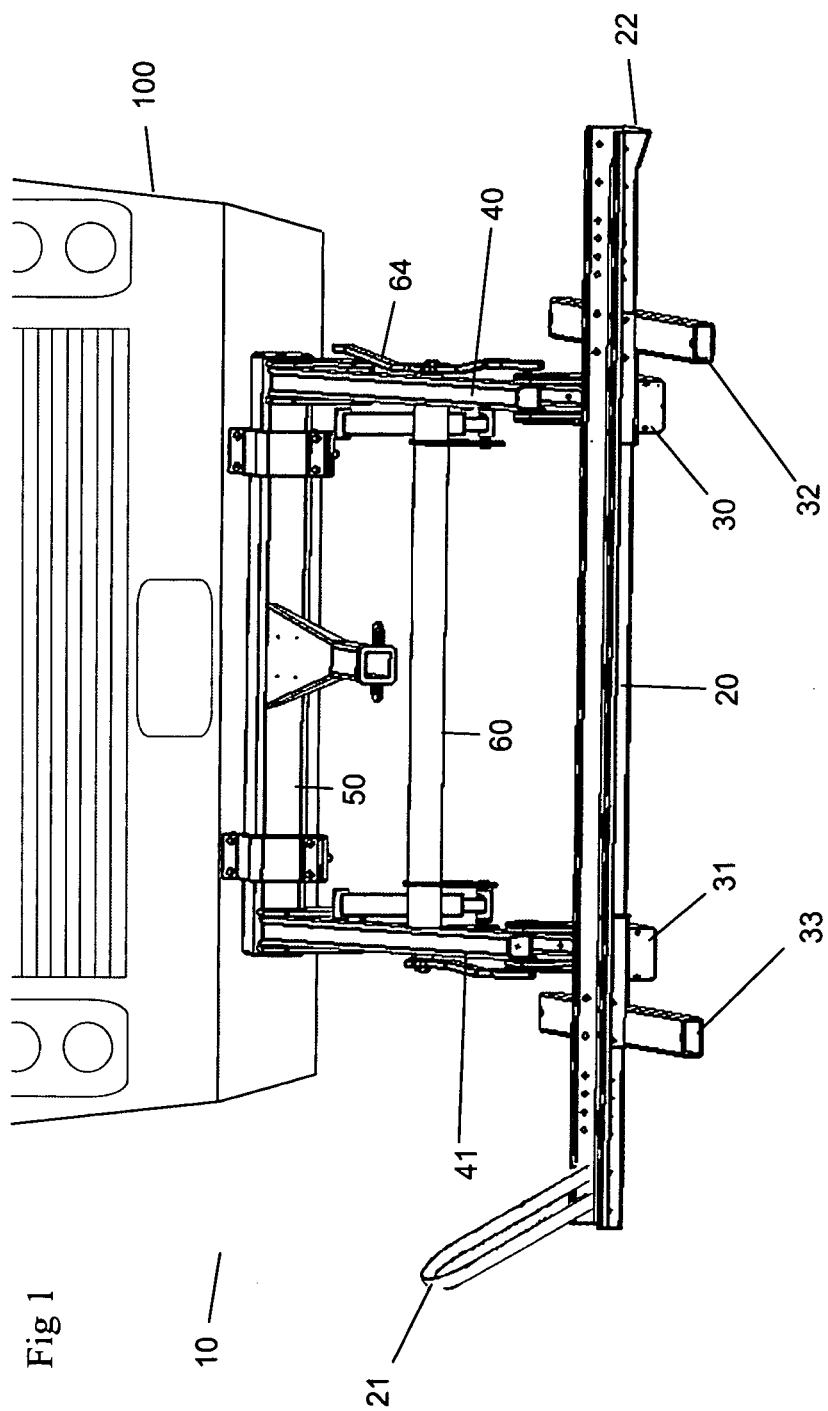
FIG. 1 is a perspective front view of a preferred embodiment of the invention in a lowered position.
Figure 12:
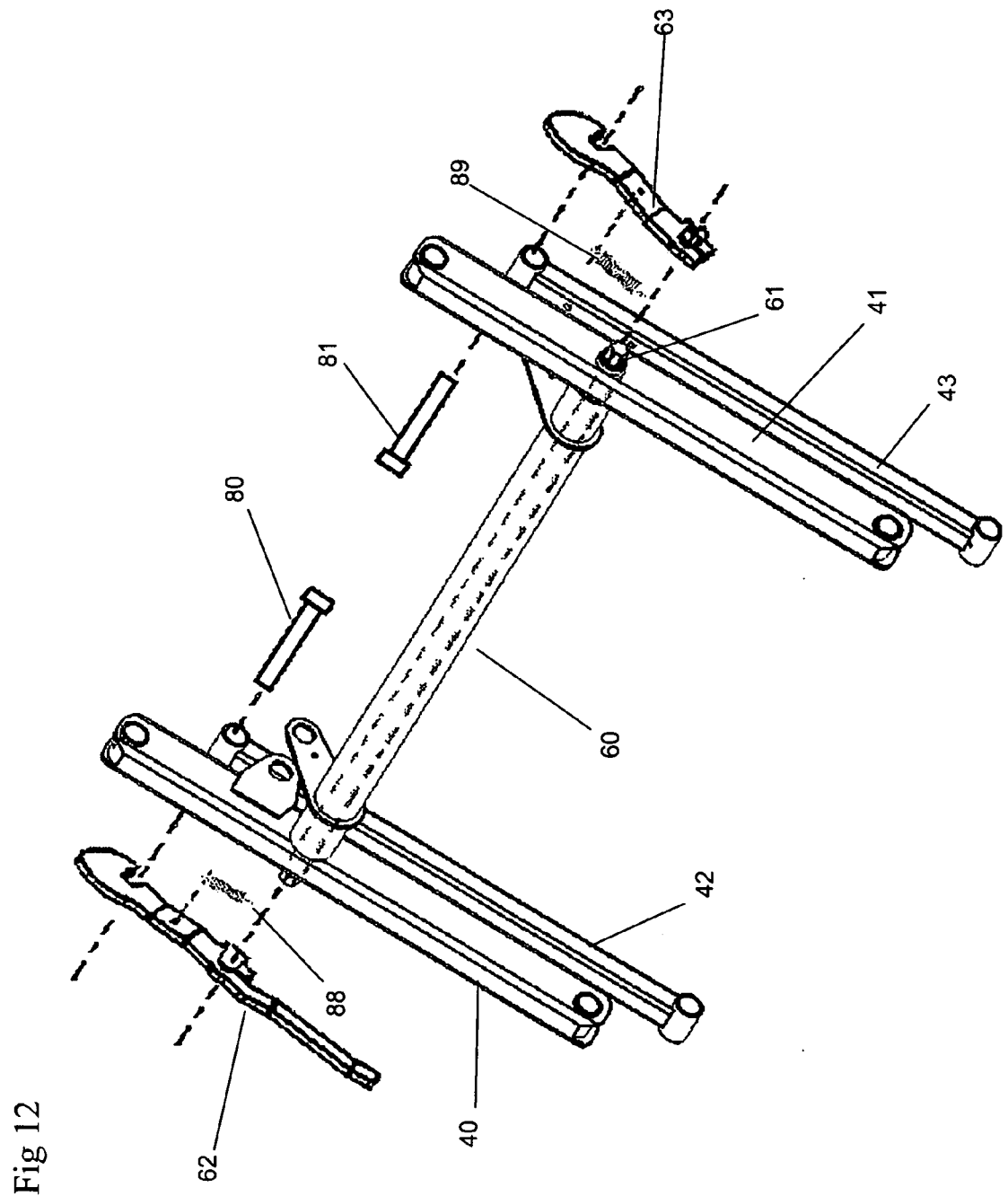
FIG. 12 is a perspective view of a preferred embodiment of the lock bar extending through the spacer sleeve.

Referring now to FIG. 1, a preferred embodiment of the vehicle lift 10 is shown attached to a vehicle 100. The vehicle lift 10 shown in FIG. 1 is in a lowered position, preferably so that a vehicle can be loaded onto the lift. A vehicle platform 20 is shown mounted on a first platform saddle 30 and second platform saddle 31. The vehicle platform 20 shown preferably is wide enough for a motorcycle or scooter tire (not shown) to rest on the platform 20. The platform 20 preferably also comprises a tire stop 21 to hold a front tire for a motorcycle or other vehicle to be carried and a ramped edge 22 to more easily roll a vehicle tire aboard the platform 20. The first and second platform saddles 30, 31 preferably further comprise tie down bars 32, 33 to further secure carried vehicles. The first and second platform saddles 30, 31 shown are pivotally attached to first and second lifting arms 40, 41 and first and second support arms 42, 43 (not shown in FIG. 1). The lifting arms 40, 41 and support arms 42, 43 are pivotally attached to a mount frame 50. As shown in FIG. 1, a spacer sleeve 60 is attached between the first and second lifting arms 40, 41. As shown in FIG. 12, each end of a lock bar 61 is seated in bearing sleeves welded inside the lifting arms 40, 41. This provides for lubrication and smoother operation of the lift's locking mechanism. The lock bar 61 extends through the spacer sleeve 60 between the lifting arms 40, 41. Preferably, a first lift lock 62, preferably with a handle 64, is mounted to the lock bar 61 at one end and a second lift lock 63 is mounted to the lock bar 61 at the other end. Thus, when the handle 64 is rotated, the lift locks 62 and 63 are pivoted simultaneously to lock the lift 10.

Figure 2:
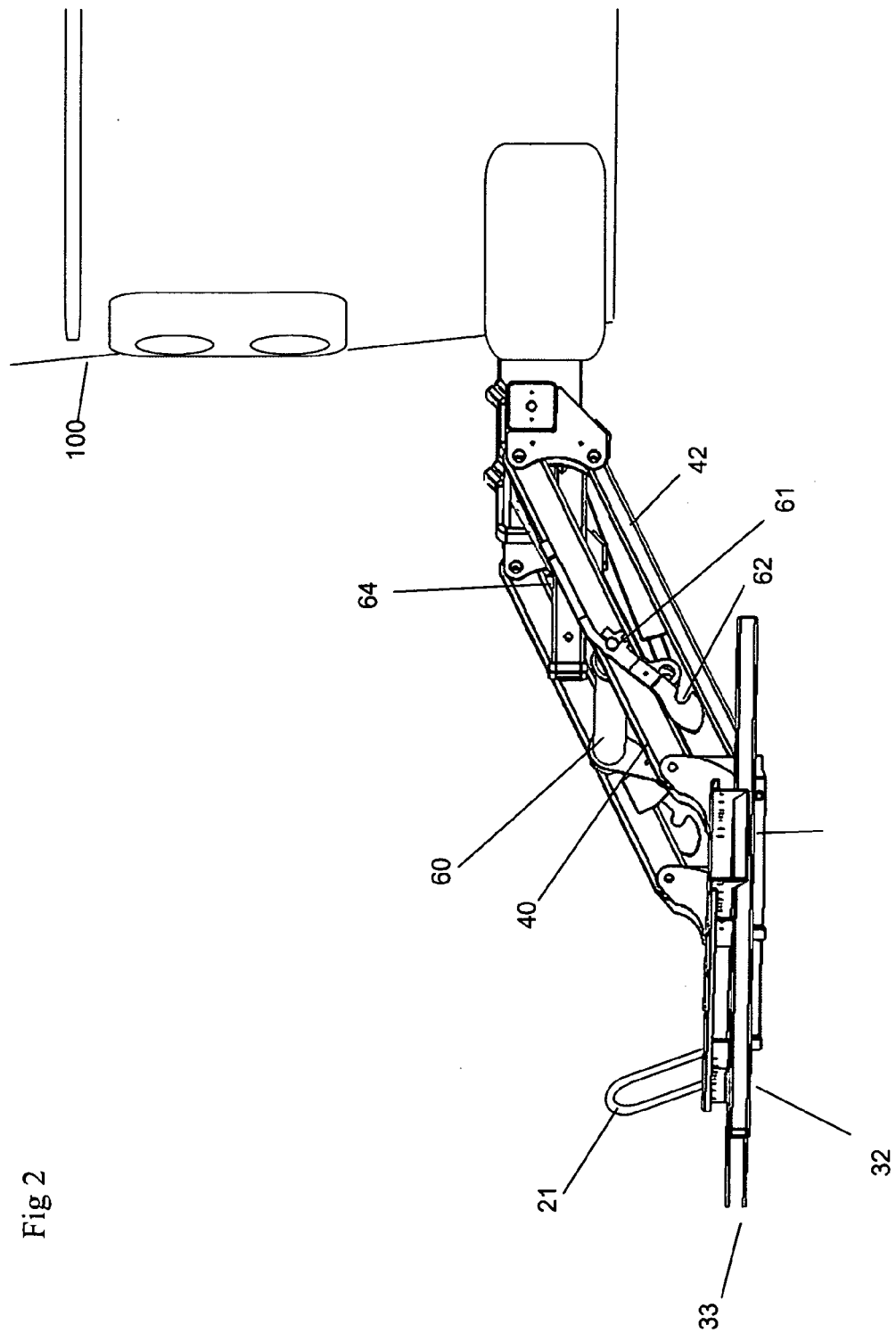
FIG. 2 is a perspective side view of a preferred embodiment of the invention in a lowered position.
Figure 3:
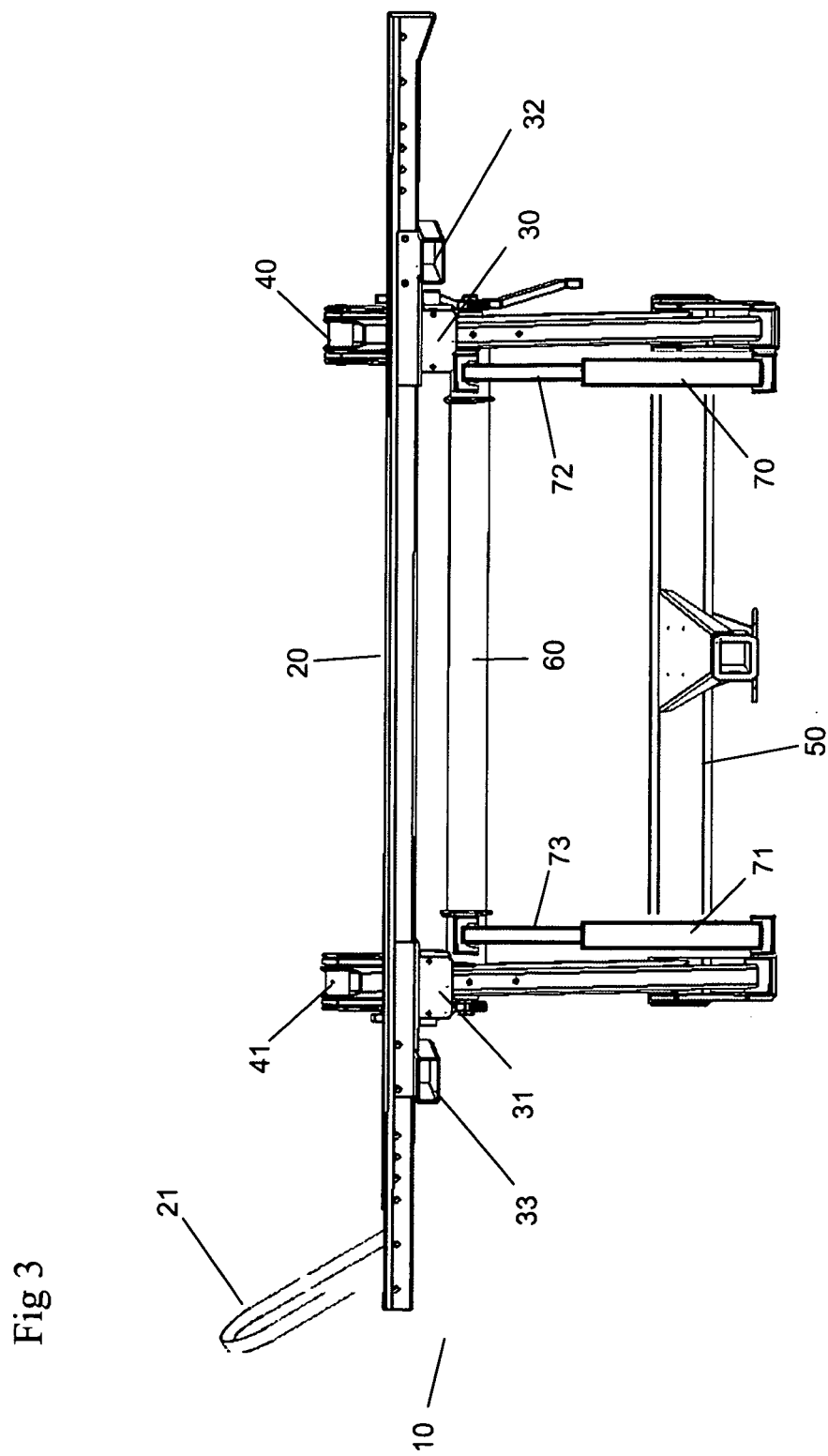
FIG. 3 is a perspective front view of a preferred embodiment of the invention in a raised position.

A side view of the vehicle lift 10 is shown in FIG. 2. The lift 10 is in the lowered position and mounted to a vehicle 100. Referring now to FIG. 3, a preferred embodiment of the vehicle lift 10 is shown in a raised position. The lift 10 is preferably raised by a first and second drive 70, 71. The preferred drives shown 70, 71 are hydraulic rams with piston and cylinder configurations. The drives 70, 71 are preferably hydraulically driven by a 12v hydraulic pump. However, the drives 70, 71 can also be electric actuators or equivalent devices. The drives 70, 71 are preferably pivotally attached at the mount frame 50 and at the upper drive mounts 66, 67 attached at the spacer sleeve 60 and lifting arms 40, 41. The drives 70, 71 raise the vehicle platform 20 by extending arms 72, 73 that push on the upper drive mounts 66, 67 and drive the lifting arms 40, 41 upward. The lifting arms 40, 41 lift the platform saddles 30, 31 and the platform 20 (preferably with the vehicle parked thereon.)

Figure 4:
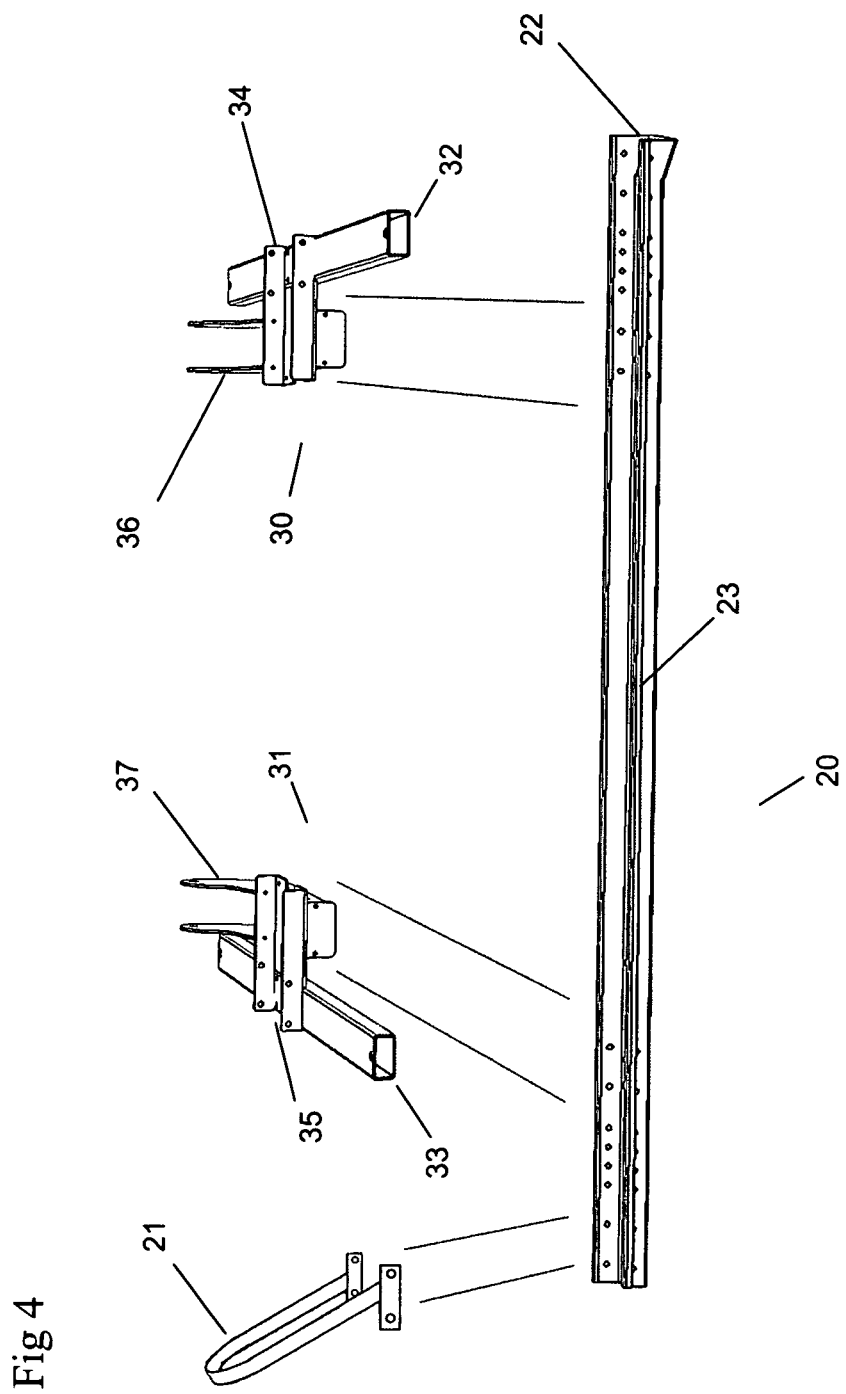
FIG. 4 is a perspective top exploded view of a preferred embodiment of the platform and platform saddles.

Referring now to FIG. 4, a preferred embodiment of the platform saddles and platform arrangement is shown in an exploded drawing. As discussed above, the platform 20 preferably has a tire stop 21 and a ramped end 22. The platform 20 also preferably has raised edges 23 to form a track for the tires of loaded vehicles. The platform saddles 30, 31 preferably have platform mounts 34, 35 on which to mount the platform 20. The saddles 30, 31 shown have arm mounts 36, 37 on which the lifting 40, 41 and support 42, 43 arms attach to the saddles 30, 31. As shown in FIG. 4, the tie bars 32, 33 are attached to the platform mounts 34, 35 and offset from the arm mounts 36, 37.

Figure 5:
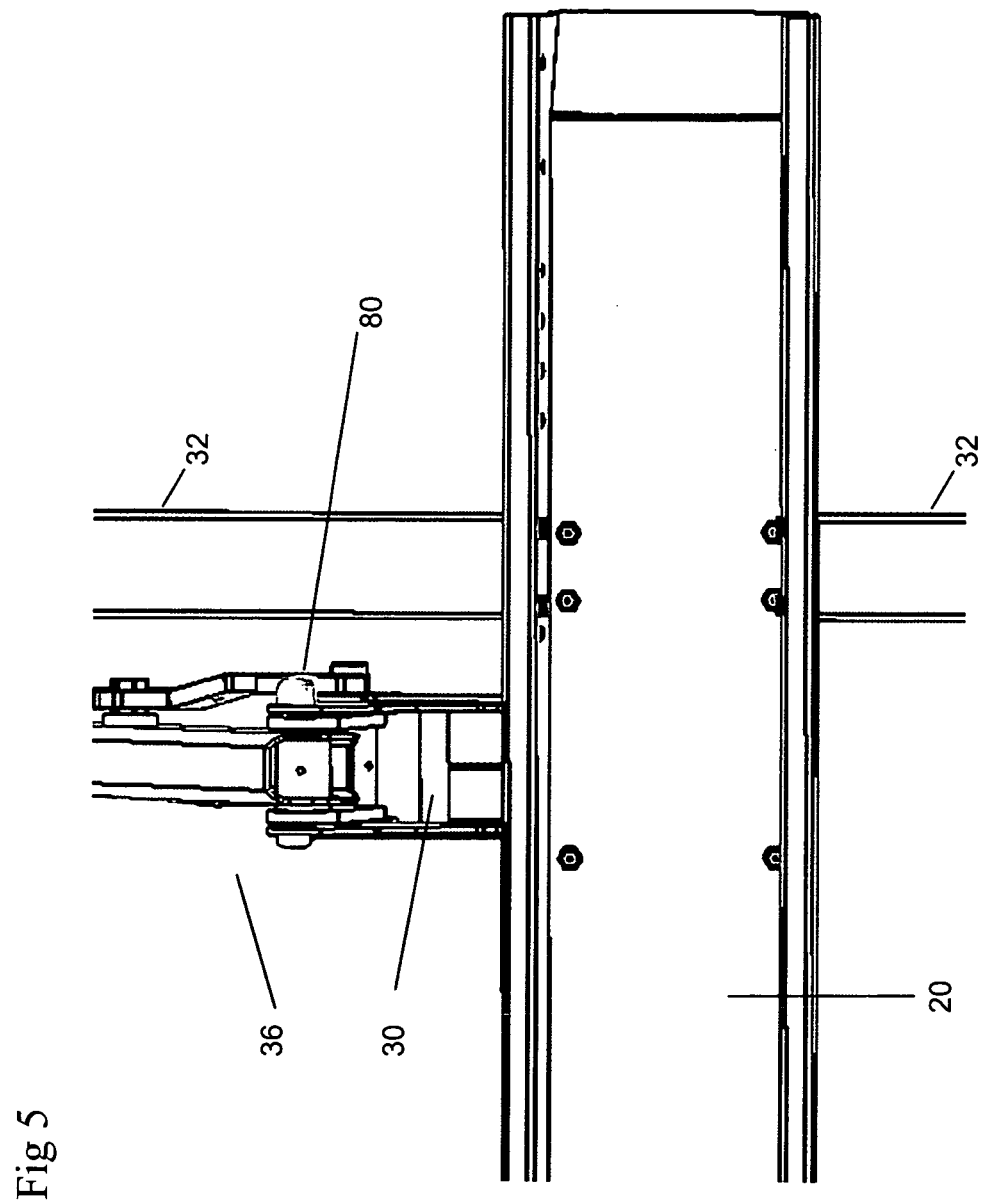
FIG. 5 is a top view of a preferred embodiment of the platform and first platform saddle.
Figure 6:
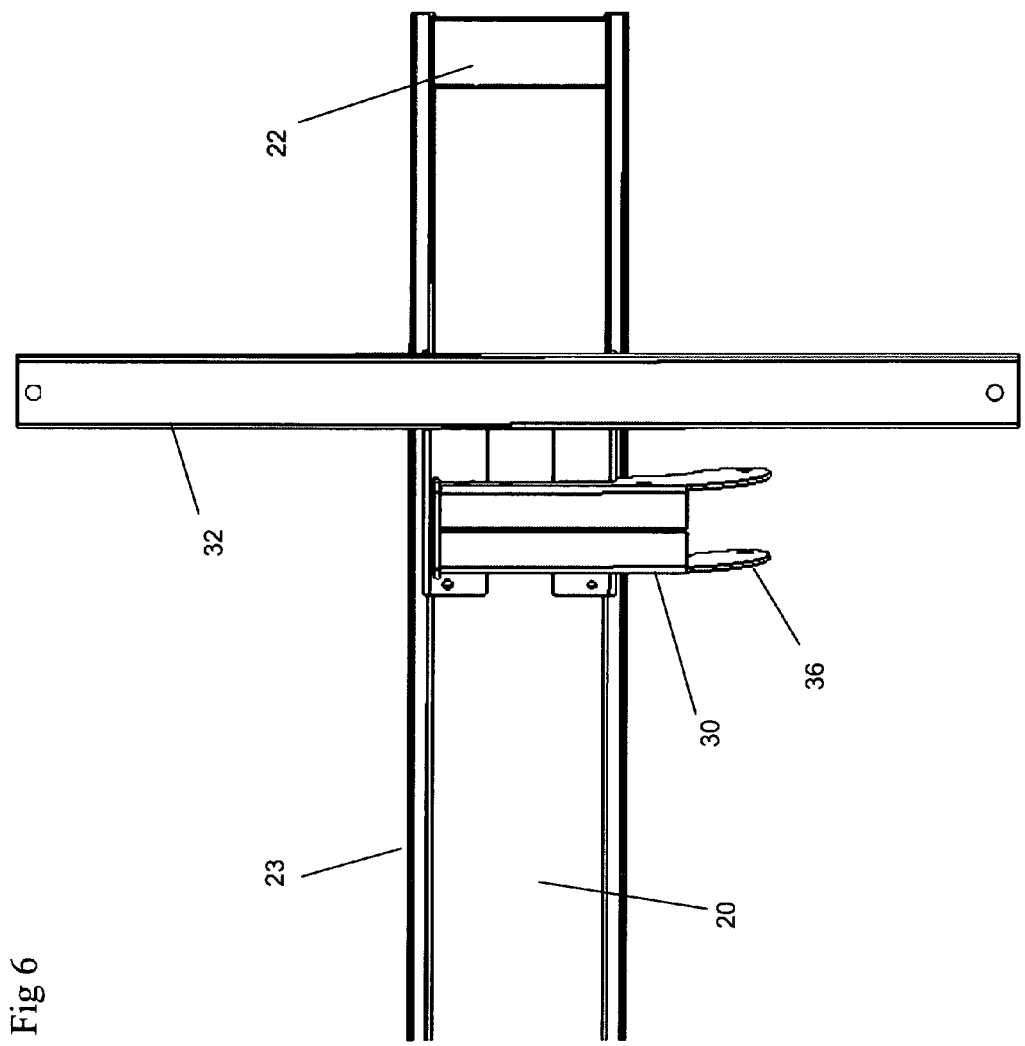
FIG. 6 is a bottom view of a preferred embodiment of the platform and first platform saddle.

Referring now to FIG. 5, a top view of the platform 20 mounted to the first saddle 30 is shown. The platform 20 is preferably bolted to the saddle 30. While riveting and other attachment means are usable, bolts or screws are preferred as the platform 20 is then more easily removable from the saddles 30, 31. Also preferable is that platform 20 is bolted to the platform mount 34 at multiple points as shown to further distribute the stress on the saddles 30, 31 when a vehicle is loaded onto the platform 20. FIG. 5 shows the platform 20 is preferably bolted to the platform mount 34 of the saddle 30 at ten different points, namely along the sides 23 and base of the platform, at the tie bar and in front of the arm mount 36. FIG. 6 shows a bottom view of the platform 20 mounted on the first saddle 30. This embodiment of the platform and saddles provides for a stronger bond between the tie bars 32, 33 and the saddles 30, 31 and the platform 20 and the saddles 30, 31 so that vehicle loads do not cause separation of the various components, particularly during loading or travel. Furthermore, by attaching the platform 20 to the saddles 30, 31 with bolts or screws, the saddles 30, 31 can be reinforced making the saddles 30, 31 stronger as separate components and unaffected by possible flexing of the ramp 20. Thus, any flexing is more likely to be limited to the platform 20 itself rather than transmitted to the saddles 30, 31 if attached by welds. Also, by having platform saddles 30, 31 and a removable platform 20, the lift 10 can be more easily disassembled for storage and/or shipping. An alternative arrangement would allow two platforms to be mounted to saddles with two platform mounts each. This alternative embodiment provides for the loading of four-wheeled vehicles such as ATVs or golf carts.

Figure 7:
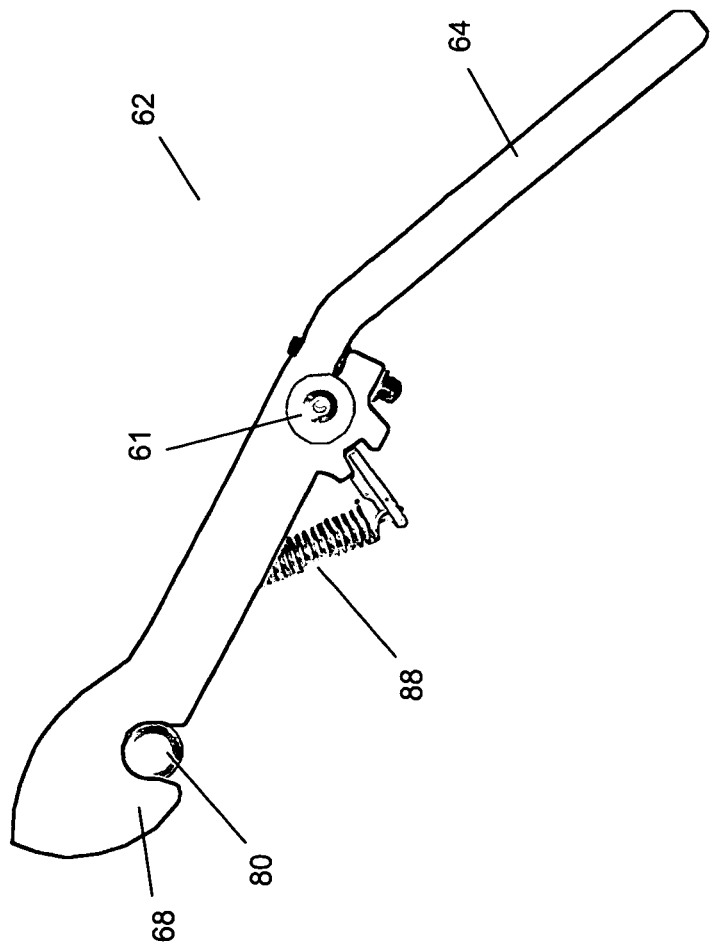
FIG. 7 is a side view of a preferred embodiment of the first lift lock.
Figure 8:
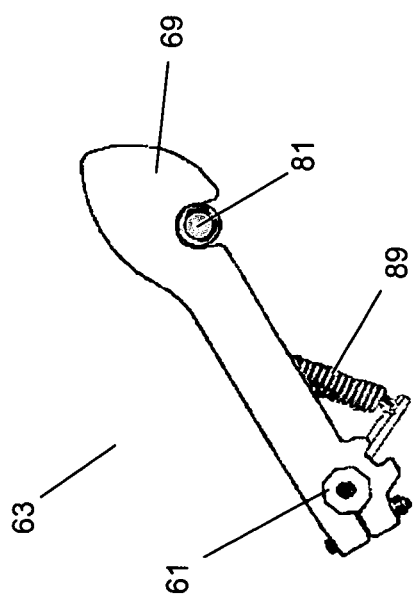
FIG. 8 is a side view of a preferred embodiment of the second lift lock.

Referring now to FIG. 7, a preferred embodiment of the first lift lock 62 is shown. The first lift lock 62 is mounted to the lock bar 61 and preferably has a handle 64 to rotate the lift locks 62, 63 and lock bar 61. The first lift lock 62 preferably is biased by a lock spring 88 to hold a pin catch 68 on a first lock pin 80 when the vehicle lift 10 is locked. The lock pin is preferably a 1" pin. FIG. 8 shows the second lift lock 63 mounted to the lock bar 61 with a second pin catch 69 and spring 89.

Figure 9:
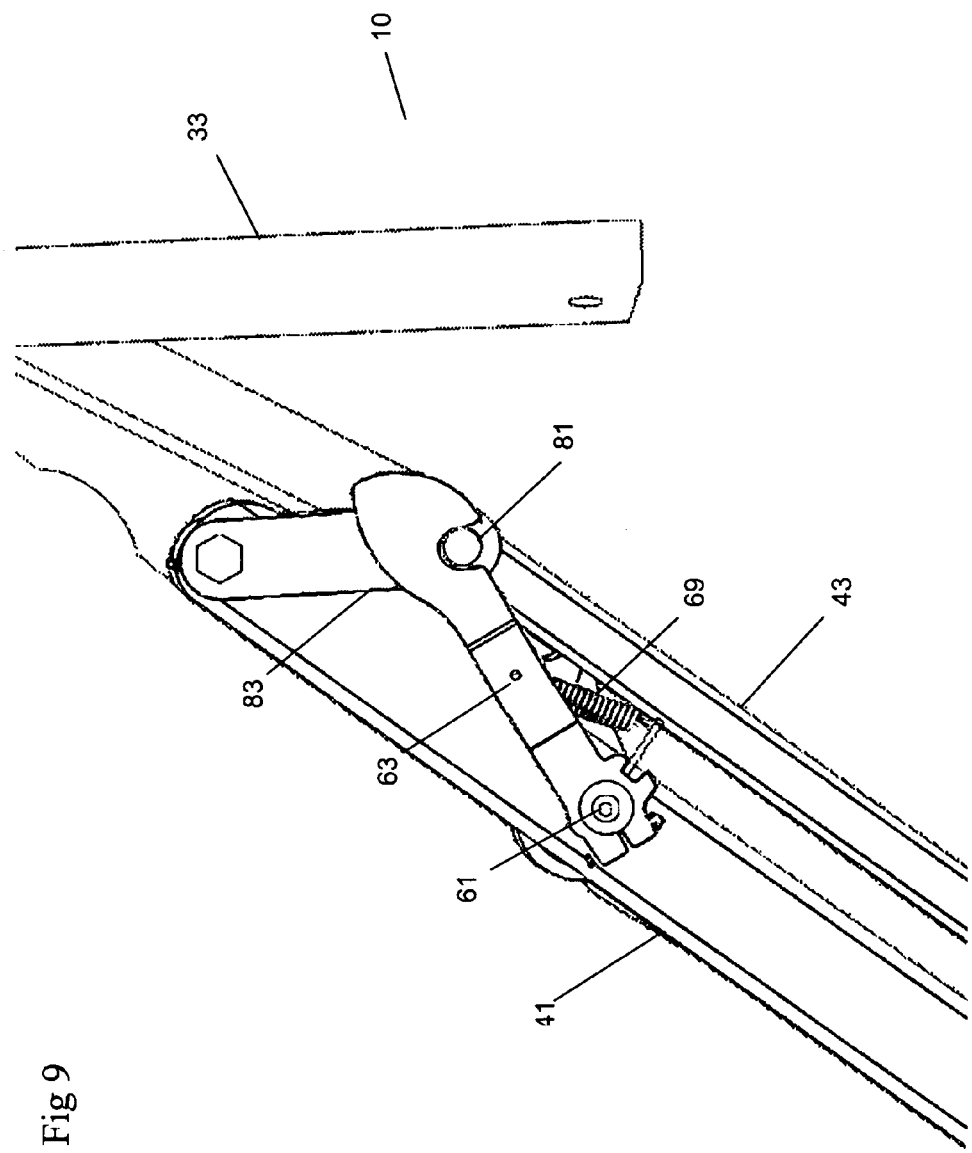
FIG. 9 is a side view of a preferred embodiment of the invention in the storage position.

Referring now to FIG. 9, a preferred embodiment of the vehicle lift 10 is shown in a storage position with the saddles 30, 31 and platform 20 locked in a vertical position. FIG. 9 shows the second lift lock 63 locked on the second lock pin 81. The lock pins 80, 81 are mounted through the support arms 42, 43 and pivot arms 82, 83 that are preferably pivotally mounted on the platform saddle 30, 31. The lock pins 80, 81 allow the lift 10 to be locked in both the raised position and the storage position.

Figure 10:
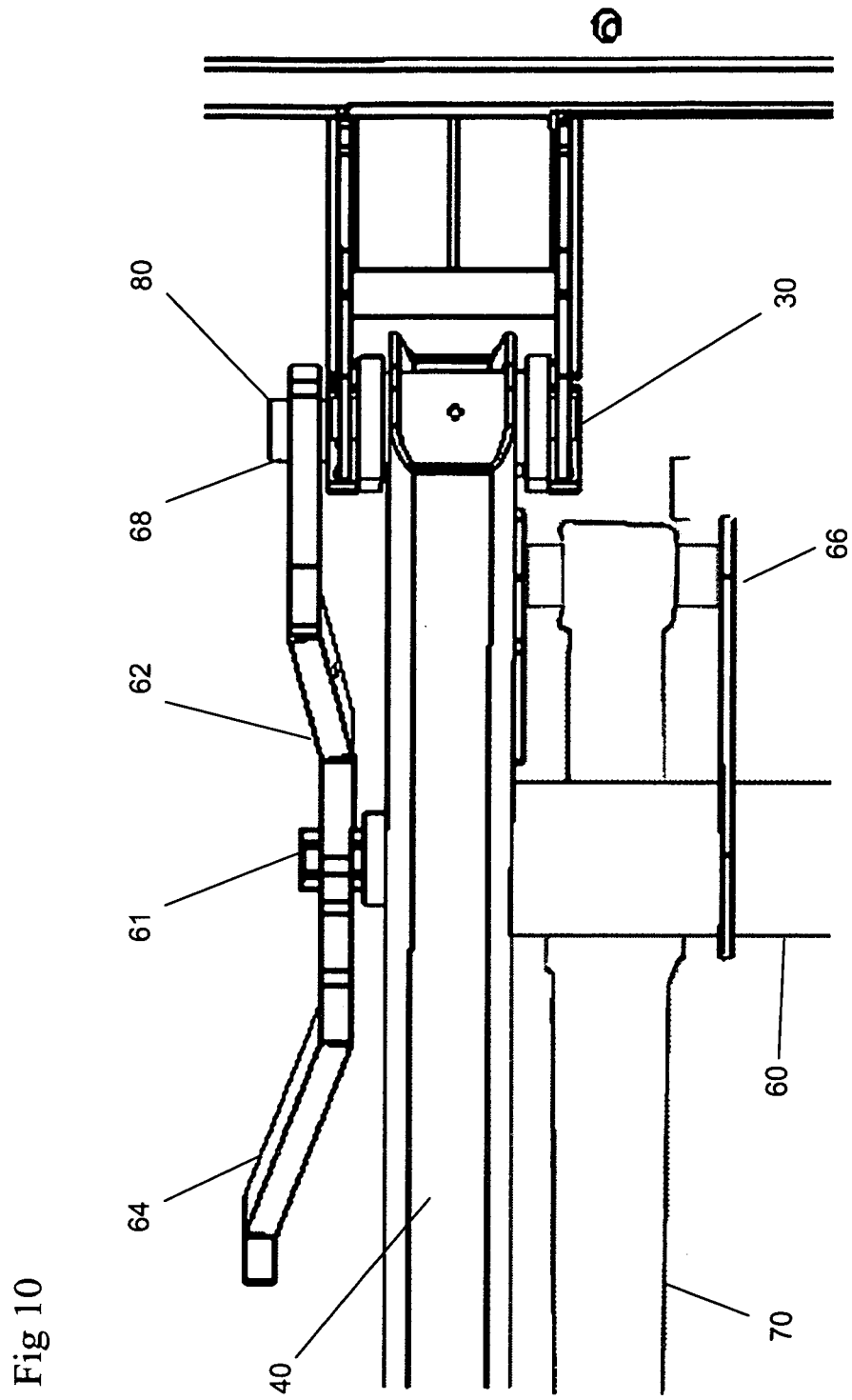
FIG. 10 is a top view of a preferred embodiment of the locking system at the first lift lock in a locked position.
Figure 11:
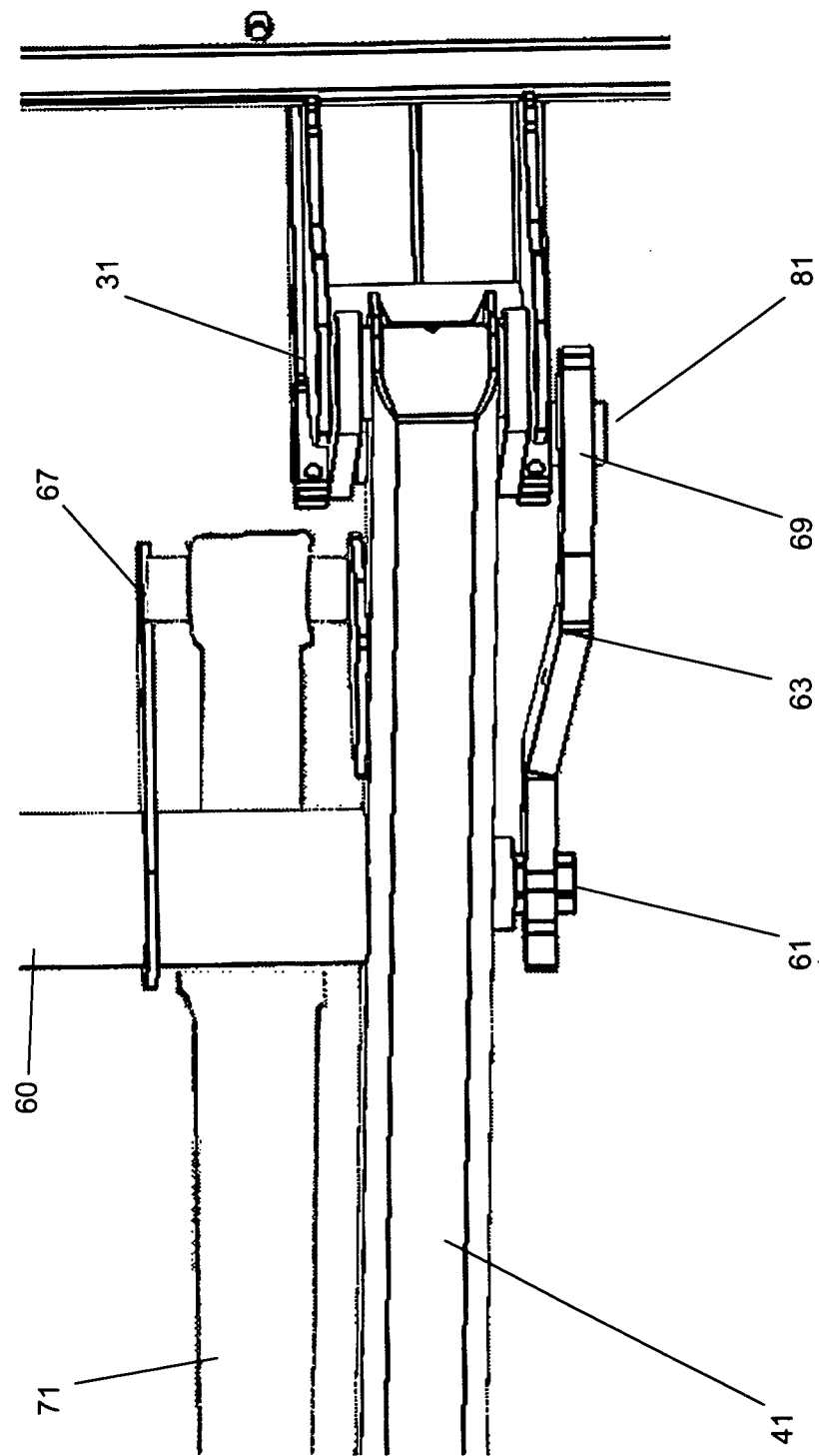
FIG. 11 is a top view of a preferred embodiment of the locking system at the second lift lock in a locked position.

Referring now to FIGS. 10 and 11, top views of a preferred embodiment of the lift locking system are shown. In FIG. 10, the first lift lock 62 with handle 64 is shown in a locked position. As shown, the first lift lock 62 is on the lock pin 80 at the pin catch 68. The first drive 70 is shown attached to the drive mount 66 between the spacer sleeve 60 and the lifting arm 40. FIG. 11 shows the second lift lock 62 in the locked position as well.

By placing the lock bar 61 inside the spacer sleeve 60 and the lifting arms 40, 41, the locking system is moved into the lift 10 itself and provides additional clearance for loading vehicles such as motorcycles. This improved locking system also reduces the overall number of parts needed for the lift in addition to eliminating lock linkage interference for loading and unloading vehicles.

Figure 13:
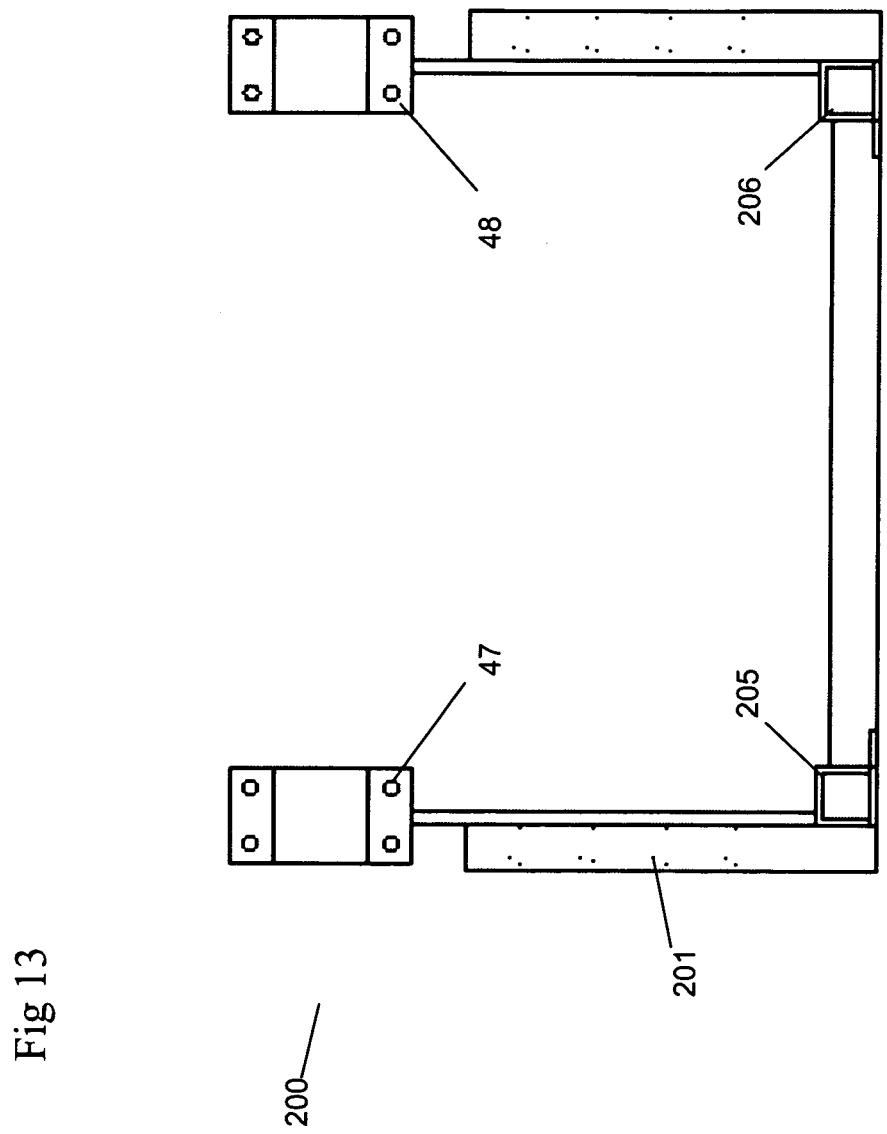
FIG. 13 is a front view of a preferred embodiment of a lift stand.
Figure 14:
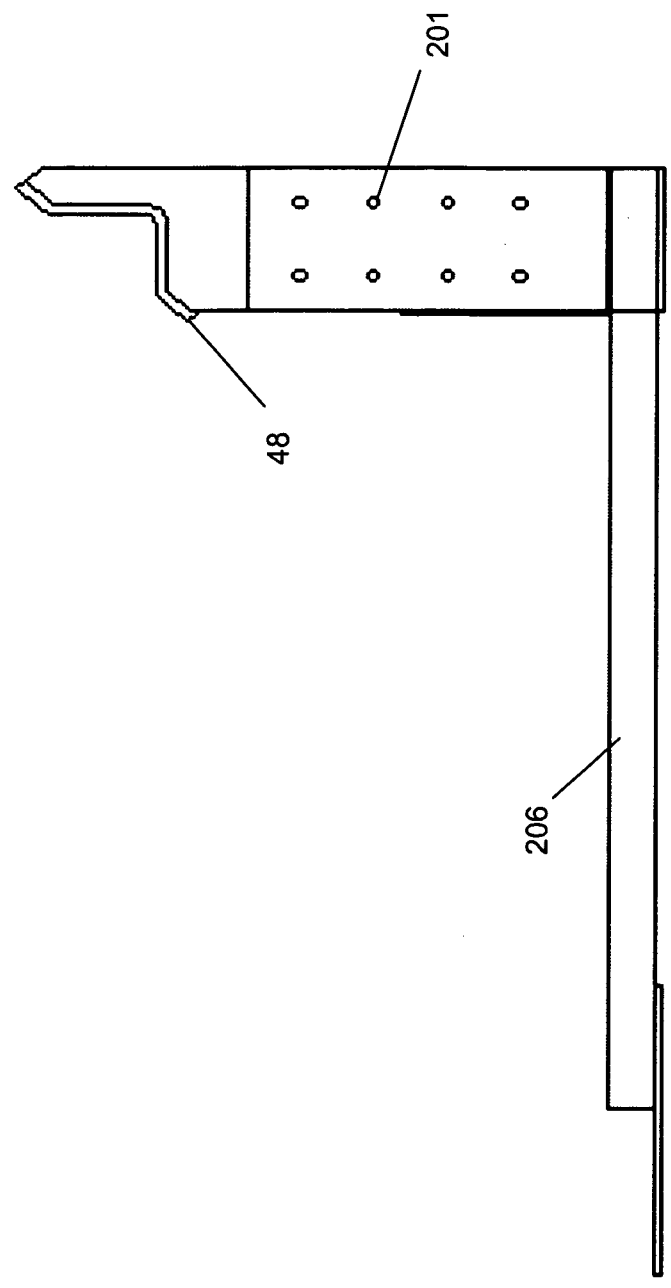
FIG. 14 is a side view of a preferred embodiment of a lift stand.
Figure 15:
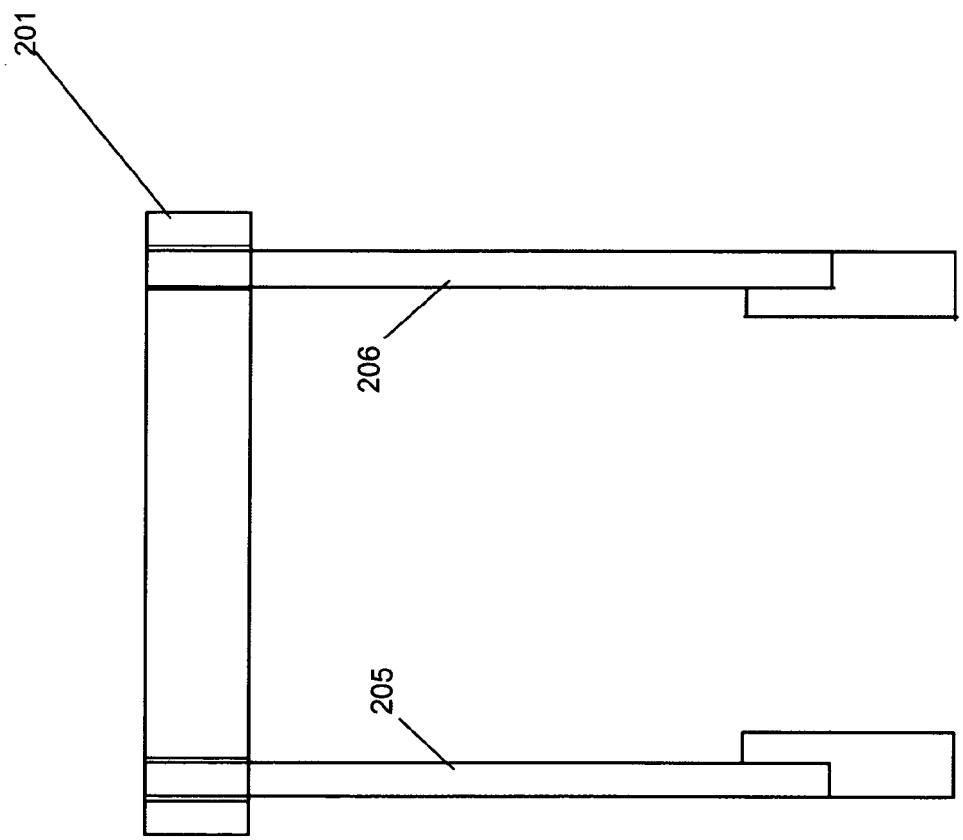
FIG. 15 is a top view of a preferred embodiment of a lift stand.
Figure 16:
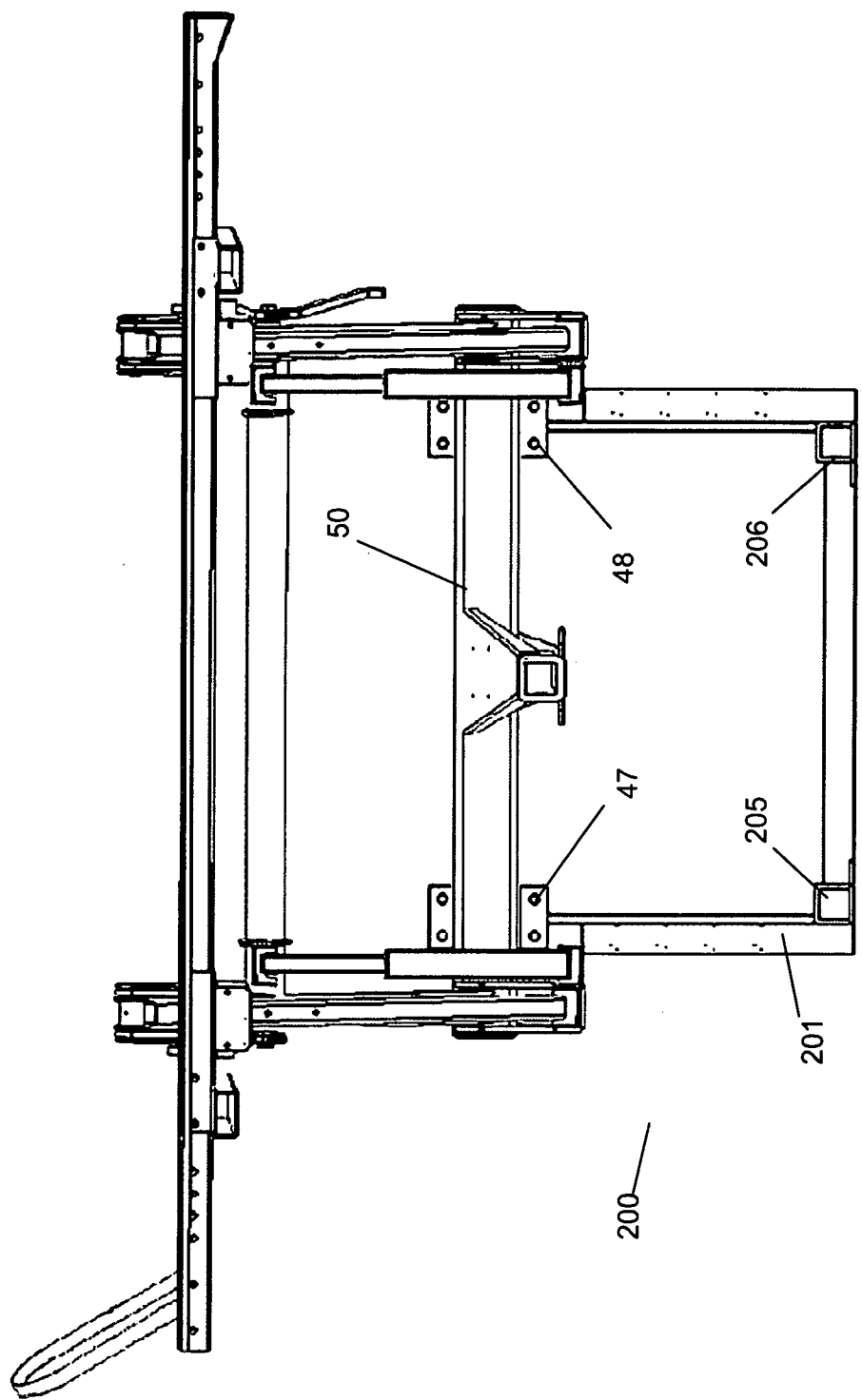
FIG. 16 is a front view of a preferred embodiment of the invention in a raised position and mounted to a lift stand.

Alternately, the mount frame 50 can be mounted to a stand separate from a vehicle 100 for stand-alone operation. For example, a preferred embodiment of a lift stand 200 is shown in FIG. 13. The stand 200 preferably has stabilizing arms 205, 206 that extend outward. The arms 205, 206 provide a counterbalance to the stand 200 so that when it is loaded with a weight on the lift 10, it reduces the chances of the lift and stand falling over or tipping. The vertical mounting base 201 place the lift 10 at a desired height above the ground. Preferably, the base 201 keeps the lift at roughly 44 inches above ground to allow for adequate clearance for the both the lowered and raised positions of the lift. However, the height could be changed for different sized lifts or different applications. As shown in FIG. 16, the mount frame 50 is preferably mounted to the stand 200 at mounting brackets 47, 48.

Thus, an improved vehicle lift is described above that has an improved locking feature and an improved vehicle platform. In each of the above embodiments, the different positions and structures of the present invention are described separately in each of the embodiments. However, it is the full intention of the inventor of the present invention that the separate aspects of each embodiment described herein may be combined with the other embodiments described herein. Those skilled in the art will appreciate that adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A vehicle lift comprising:
  a vehicle platform mounted to a first platform saddle and a second platform saddle and supported by a first lifting arm and a second lifting arm;
  the first lifting arm pivotally attached to a mount frame at a first end and pivotally attached to the first platform saddle at a second end;
  the second lifting arm pivotally attached to the mount frame at a first end and pivotally attached to the second platform saddle at a second end;
  a first support arm pivotally attached to the mount frame below the first end of the first lifting arm and pivotally attached to the first platform saddle below the second end of the first lifting arm;
  a second support arm pivotally attached to the mount frame below the first end of the second lifting arm and pivotally attached to the second platform saddle below the second end of the second lifting arm;
  a spacer sleeve between the lifting arms and attached to the first and second lifting arms;
  a lock bar inserted through the spacer sleeve having a first lift lock on a first end and a second lift lock on a second end;
  a first drive mounted to the mount frame at a first end and the first lifting arm at a second end;

a second drive mounted to the mount frame at a first end and the second lifting arm at a second end;

where the platform is in a raised position when the first and second drives are extended and where the platform is in a lowered position when the first and second drives are contracted; and, where the lift locks are lockable when the vehicle platform is in the raised position.

2. The vehicle lift of claim 1 where the first and second drives are hydraulic rams with a piston and cylinder arrangement.

3. The vehicle lift of claim 1 where the first and second drives are electric actuators.

4. The vehicle lift of claim 1 where the first drive is pivotally mounted to the spacer sleeve and the first lifting arm and the second drive is pivotally mounted to the spacer sleeve and the second lifting arm.

5. The vehicle lift of claim 4 where the spacer sleeve and first lifting arm has a first upper mount for the first drive the spacer sleeve and second lifting arms has a second upper mount for the second drive.

6. The vehicle lift of claim 1 where the vehicle platform is removably secured to the first and second platform saddles.

7. The vehicle lift of claim 6 where the first and second platform saddles have mounting bases for seating the vehicle platform.

8. The vehicle lift of claim 7 where the first and second platform saddles have tie down bars mounted below and offset from the mounting bases.

9. The vehicle lift of claim 6 where the first support arm further comprises a first lock pin for the first lift lock and the second support arm further comprises a second lock pin for the second lift lock.

10. The vehicle lift of claim 9 where a first pivot arm extends between the first lifting arm and the first support arm at the first lock pin and where a second pivot arm extends between the second lifting arm and the second support arm at the second lock pin.

11. The vehicle lift of claim 1 where the lift is mounted to a lift stand.

* * * * *